UNITED STATES PATENT OFFICE 2,504,082

ACRYLIC ESTERS OF ALKOXY-3-BUTENOLS AND POLYMERS THEREFROM

Harry T. Neher, Bristol, Willard J. Croxall, Bryn Athyn, and Edwin H. Kroeker, Cheltenham, Pa., assignors to Röhm & Haas Company, Philadelphia, Pa., a corporation of Delaware No Drawing. Application August 14, 1947, Serial No. 768,708

10 Claims. (Cl. 260—86.1)

This invention relates to new esters and the polymeric materials formed therefrom. More specifically this invention deals with alkoxybutenyl esters of acrylic and methacrylic acids and the polymers and copolymers formed therefrom It has previously been proposed to form polymers from unsaturated esters of various types. Among these esters have been those from acrylic acid and alcohols, the non-hydroxyl portion of which is an unsaturated hydrocarbon residue. Attempts to cast-polymerize these esters have not been entirely successful, even though many variations in polymerization techniques have been proposed. It has been suggested, for example, that the large shrinkage usually encountered with such esters may be overcome by initiating polymerization and at an intermediate stage of polymerization extracting remaining monomer before completing polymerization. It has also been proposed to separate polymer and monomer by precipitation with solvents for the monomer. Again, it has been proposed to carry out the initial polymerization in solvent solution, separate polymer, and complete polymerization thereof in a subsequent step. These are but typical of the improvisations proposed to handle and convert to insoluble products previously known esters which are capable of cross-linking.

Furthermore, the previously known unsaturated polymerizable esters have given friable or fragile gelation products as intermediate polymers. These have been difficult to handle and great care has been required in handling and converting them to the infusible stage. Upon conversion of these intermediates to the cross-linked state there have been obtained polymers which have been rather brittle and low in impact strength.

There has now been discovered a class of acrylic esters which is relatively free from difficulties such as discussed above and which provides primary or intermediate polymers which are rubbery, are safely handled and shaped, and may be converted to hard, insoluble, infusible cross-linked polymers.

This class comprises the esters of acrylic or methacrylic acid and the alkoxybut-3-enols in which the alkoxy group is formed with aliphatic hydrocarbon groups of one to four carbon atoms. These butenols are of the formula

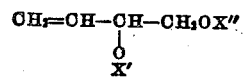

wherein one of the substituents X' and X" is hydrogen and the other is an aliphatic hydrocarbon group of one to four carbon atoms.

These butenols are obtained by reacting butadiene monoxide,

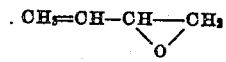

with a lower aliphatic alcohol, ROH. The two reactants add together with opening of the epoxy ring. As the result of such addition, both 2-alkoxy-3-butene-1-ols and 1-alkoxy-3-butene-2-ols may be formed. When addition is performed in the presence of an acid catalyst, the former type of compound is formed or, at least, predominates whereas, with a basic catalyst, the latter type appears to be formed primarily. It is evident from our work, however, that the esters formed from either of these alcohols have practically identical behaviors in polymerization. Esters have been prepared from addition products formed under acid conditions and under basic conditions and parallel polymerizations carried out. Gelling times were the same and the final polymers had substantially the same properties.

The aliphatic alcohol, ROH, may have one to four carbon atoms as in methyl, ethyl, propyl, or butyl alcohols and isomers thereof, and as in crotyl, methallyl, or allyl alcohols. In all cases alkoxybutenols are formed which yield esters of acrylic and methacrylic acids with the unique and valuable properties described above. The intermediate or primary polymers are rubbery and sufficiently strong to permit shaping. These intermediate polymers on further heating yield cross-linked polymers which are hard and insoluble.

Alkoxybutenols from longer chained alcohols than butyl have been prepared and used for the preparation of acrylic and methacrylic esters, but these esters do not have the full advantage of the desired properties. The intermediate polymers from octoxybut-3-ene-ols or dodecyloxybut-3-ene-ols, for example, are more friable than the polymers from the preferred esters, while their final polymers lack the desired hardness.

The reaction between butadiene monoxide and alcohol may be performed at 30° C. to about 90° C. by direct addition of one reactant to the other. Excess alcohol is conveniently used as a solvent. Acidic or basic catalyst may be added thereto. The butadiene monoxide may be added with control of temperature. After the reaction appears to be complete, the catalyst may be destroyed and the alkoxybutenol formed by addition worked up and separated.

Typical preparations of alkoxybutenols are given in the following examples.

Example 1

There were placed in a reaction flask, equipped with stirrer, reflux condenser, thermometer, and dropping funnel, 1920 grams of methanol and 6 grams of an acidic catalyst prepared from equal parts of methanol and boron trifluoride. To this reaction flask there was then added slowly 638 grams of butadiene monoxide. The reaction temperature was held at 50° to 55° C. by external cooling. After all of the monoxide had been added, stirring was continued for an hour. The catalyst was then destroyed with a little sodium methoxide solution. Fractionation was thereupon performed with a two-foot column packed with aluminum jack chain. The excess methanol was taken off at 64° C. and the temperature raised to 142° C. where the desired methoxybutenol began to distil. The pressure and temperature were reduced and a fraction of 759 grams taken off at 56° C./25 mm. This was practically pure 2-methoxy-3-butene-1-ol.

By a similar procedure there may be prepared other alkoxybutenols by substitution of ethyl, propyl, isopropyl, or the various butyl alcohols for the methyl alcohol used above. The 2-butoxy-3-butene-1-ol, for example, distils at 82°–84° C. at 27 mm. when prepared by the same general procedure as described above with substitution of n-butanol for the methanol.

Example 2

There were added to a reaction vessel equipped with stirrer, reflux condenser, and dropping funnel about 550 grams of allyl alcohol and 2 grams of an ethyl ether-boron trifluoride complex. There was then slowly added with stirring and control of temperature at about 50° C. 140 grams of butadiene monoxide. The reaction mixture was left standing for a short time and then fractionated. There was obtained 2-alloxy-3-butene-1-ol in an amount of 151 grams. The compound boiled at 74° C. at 20 mm. pressure.

Example 3

To 660 grams of methanol there was added 10 grams of sodium which was allowed to dissolve. The resulting solution was heated to 65° C. and 350 grams of butadiene monoxide added over a period of one hour. The reaction mixture was refluxed an hour and left standing for three hours. It was then fractionated through a packed column. There was obtained at 85° C. at 100 mm. pressure a fraction of 384 grams of 1-methoxy-3-butene-2-ol.

The alkoxybutenols may be esterified with acrylic or methacrylic acid to yield alkoxybutenyl esters. The preparation of these esters may also be performed through transesterification with lower alcohol esters of acrylic or methacrylic acids in the presence of a catalyst. Thus, an alkoxybutenol is heated with an ester of acrylic acid and an acid catalyst, such as p-toluene sulfonic acid, or is heated with an ester of methacrylic acid and a basic catalyst, such as sodium methoxide. The lower alcohol may be volatilized and removed.

Typical preparations of esters are given in the following examples.

Example 4

In a reaction vessel equipped with stirrer, thermometer, and condenser with trap for removing water there were placed 98 grams of 2-methoxy-3-butene-1-ol, 100 grams of acrylic acid, 100 grams of benzene, 3 grams of beta-naphthol, and 2 grams of p-toluene sulfonic acid. The mixture was heated under reflux, and water of esterification was removed in the trap. When the theoretical amount of water had been collected, the reaction mixture was cooled, washed with sodium carbonate solution, and dried over anhydrous potassium carbonate. The dried solution was distilled with fractionation. The fraction distilling at 50° C./1 mm. to 54° C/2 mm. amounted to 85 grams. It was a methoxybutenyl acrylate of 99% purity by saponification number. This ester has the formula

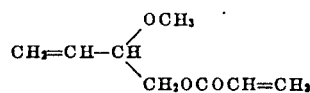

Example 5

There were mixed in a reaction vessel equipped with a fractionating column 120 grams of 2-alloxy-3-butene-1-ol, 200 grams of methyl methacrylate, 2 grams of beta-naphthol (as a typical polymerization inhibitor), and a solution from 2 grams of sodium in a small amount of methanol (as transesterification catalyst). The mixture was heated and methanol removed by fractionation. When methanol could no longer be obtained, the reaction mixture was cooled, washed with water, and dried over anhydrous potassium carbonate. The dried mixture was fractionated. There was obtained at 71° C. at 2 mm. pressure a fraction of 105 grams of 2-alloxy-3-butenyl methacrylate,

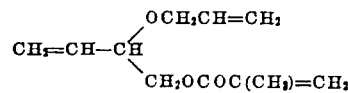

Example 6

By the procedure of Example 5 there were heated together 400 grams of methyl methacrylate, 288 grams of 2-butoxy-3-butene-1-ol, 4 grams of beta-naphthol, and a solution of 2 grams of sodium in about 25 grams of methanol. There was obtained at 65° C./1 mm. a fraction of 270 grams of 2-butoxy-3-butenyl methacrylate,

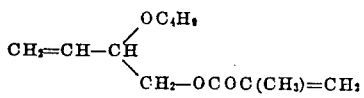

Example 7

By the procedure of Examples 5 and 6 there was obtained from 516 grams of 2-methoxy-3-butene-1-ol, 1200 grams of methyl methacrylate, 10 grams of beta-naphthol, and a solution of 6 grams of sodium in 140 grams of methanol a fraction of 413 grams of 2-methoxy-3-butenyl methacrylate, distilling at 47° C./0.5 mm. to 49° C./1 mm.,

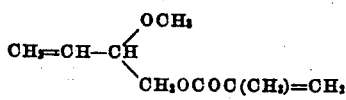

Example 8

By the above procedure there was obtained from 102 grams of 1-methoxy-3-butene-2-ol, 200 grams of methyl methacrylate, 2 grams of beta-naphthol, and a solution of 2 grams of sodium in 20 grams of methanol a fraction of 110 grams distilling at 43° C./1 mm., corresponding in composition to 1-methoxy-3-butenyl methacrylate,

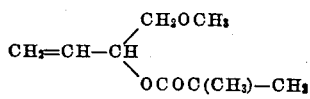

The alkoxybutenyl acrylates and methacrylates are polymerizable with peroxide catalysts such as acetyl peroxide, benzoyl peroxide, lauroyl peroxide, tert.-butyl hydroperoxide, tert.-butyl perbenzoate, or the like. The primary polymerization is best effected at 50° C. to 80° C. although somewhat higher temperatures may at times be desirable and lower temperatures may be used with longer periods of polymerization. Usually in 8 to 24 hours a tough, rubbery gel has been formed which can be handled and shaped. Such gel may be, for example, formed as a flat sheet in a glass or stainless steel cell. The sheet may be removed therefrom and molded on a curved form. When the gelled polymer is heated at 110° C. to 150° C., it becomes hard, tough, and insoluble. The final polymer is free of "elastic memory." This polymer is cross-linked. This final stage of polymerization may be carried out for one to sixteen hours.

In addition to polymers of a single alkoxy-butenyl acrylate or methacrylate, there may be formed copolymers from mixtures of these esters or copolymers of these esters and other polymerizable ethenoids which are miscible and compatible therewith. In particular, the alkoxybutenyl acrylates and methacrylates form highly useful copolymers with esters of acrylic and/or methacrylic acid and a lower aliphatic alcohol, particularly methyl and ethyl alcohols. The proportions of these two types may be widely varied. When the lower aliphatic esters are in preponderant proportion, there remains considerable thermoplasticity. A small amount of an alkoxybutenyl acrylate or methacrylate serves, therefore, from one point of view to raise the softening point of the alkyl acrylates or methacrylates. With a preponderant proportion of an alkoxybutenyl ester the resins are distinctly of the thermoset type.

Examples of the preparation of polymeric materials follow. The parts shown are by weight.

Example 9

Into 100 parts of 2-methoxy-3-butenyl methacrylate were dissolved one-half part of benzoyl peroxide and one-half part of tert.-butyl perbenzoate. This solution was placed in a glass-walled cell and heated for 16 hours at 68° C. It had become by that time a rubbery and flexible sheet, which was removed from the cell and shaped over a hemi-spherical form having an eight-inch radius. The shaped sheet was then heated at 135° C. for three hours. There was thus obtained a hard, tough form free from elastic memory. This form was further heated for 16 hours at 135° C. without a change in shape resulting.

Example 10

There were mixed 75 parts of 2-methoxy-3-butenyl acrylate and 25 parts of methyl methacrylate and one-half part each of benzoyl peroxide and tert.-butyl perbenzoate dissolved therein. This mixture was heated in a glass-walled cell for 16 hours at 65° C. and then for four hours at 135° C. in a curved mold. The resulting curved object was removed from the mold and heated at 140° C.–145° C. for several hours without loss of shape. The product had some flexibility and considerable hardness. The strength of the copolymer was greater than that of pure polymeric methoxybutenyl acrylate.

Example 11

A mixture of 50 parts of 2-methoxy-3-butenyl methacrylate and 50 parts of methyl methacrylate was treated with one-half part of benzoyl peroxide and placed in a glass cell. The cell and contents were heated at 70° C. for 16 hours. There was thus obtained a tough, rubbery sheet which was shaped and heated in a mold for one hour at 140° C. The rubbery sheet had a heat distortion temperature of 73° C., but, after being cured, the shaped sheet had a heat distortion temperature of 91° C. The product was tough, rather hard, but still somewhat thermoplastic because of the large amount of methyl methacrylate used.

Example 12

A mixture was prepared from 90 parts of 2-methoxy-3-butenyl methacrylate, 10 parts of methyl methacrylate, 0.5 part of tert.-butyl perbenzoate, and 0.5 part of benzoyl peroxide and cured in a casting cell at 66° C. overnight. The resulting rubbery polymer was cured at 140° C. for two hours. The final polymer was hard, tough, and not thermoplastic.

Example 13

One hundred parts of 2-alloxy-3-butenyl methacrylate was treated with 0.3 part of tert.-butyl perbenzoate and 0.2 part of benzoyl peroxide. This mixture was heated in a casting cell for 16 hours at 65° C. A flexible and tough product resulted. This polymer is harder than the polymer from the methoxybutenyl methacrylates. The flexible primary product was shaped and heated for one hour at 110° C. and then one hour at 125° C. The final polymer was hard and quite tough. It was free of elastic memory.

Example 14

A mixture of one-half part each of tert.-butyl perbonzoate and benzoyl peroxide and of 100 parts of 2-butoxy-3-butenyl methacrylate was polymerized at 75° C. for 16 hours. A tough, rubbery product resulted which could be cut into strips, tied in knots and cured at 110°–150° C. to a tough, thermoset product with some flexibility, but free of elastic memory.

Fabric may be impregnated with butoxybutenyl methacrylate and laminated articles formed therewith. The articles, when given a final curing for an hour at 135° C. and two hours at 145° C., are strong and tough with some flexibility. They retain their shape even when hot.

Example 15

A mixture was prepared from 75 parts of 1-butoxy-3-butenyl methacrylate, 25 parts of methyl methacrylate, and 0.5 part of benzoyl peroxide. After a primary polymerization at 60° C. for 16 hours, the copolymer was hardened at 140° C. for two hours. A hard, tough, clear product was obtained which was free of elastic memory. The polymer here was less flexible than the butoxybutenyl polymer of Example 14.

The esters of this invention are defined by the general formula

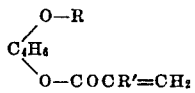

where R is an aliphatic hydrocarbon group of one to four carbon atoms, R' is a methyl group or hydrogen, and $C_4H_6$ is a 3-butenyl group, an aliphatic hydrocarbon chain having an olefinic linkage in the 3,4-position, the oxygen linkages thereto being in the 1- and 2-positions.

These esters yield as demonstrated above primary polymers which are tough and rubbery and final polymers which are thermoset, hard, and still tough. Mixtures of the above alkoxybutenyl acrylates and methacrylates may be made and polymerized or one or more of them may be copolymerized in a wide range of proportions with ethenoids generally; i. e., vinylidene compounds or compounds having a terminal pair of olefinically bonded carbon atoms, including not only acrylic and methacrylic esters of other aliphatic alcohols but also vinyl chloride, vinyl acetate, vinyl propionate, vinyl ethyl ether, styrene, acrylonitrile, methacrylonitrile, acrylamide, methacrylamide, and the like. The esters of this invention may also be copolymerized with diolefinic compounds, such as chloroprene, butadiene, and mixtures of butadiene with isobutylene, styrene, and acrylonitrile.

*Example 16*

A mixture of 75 parts of 2-methoxy-3-butenyl methacrylate and 25 parts of butyl acrylate was treated with one-half part of tert.-butyl perbenzoate and placed in a glass cell. The cell and contents were heated for 65 hours at 65° C. and for five hours at 110° C. The product was a tough, flexible, colorless sheet.

*Example 17*

A mixture was prepared from 90 parts of 2-methoxy-3-butenyl methacrylate and 10 parts of octyl acrylate and one-half part of tert.-butyl perbenzoate and heated in a casting cell for 65 hours at 65° C. The resulting rubbery polymer was cured for five hours at 110° C. The final polymer was a tough, flexible, colorless sheet.

*Example 18*

There were mixed 75 parts of 2-methoxy-3-butenyl methacrylate and 25 parts of butyl methacrylate and one-half part of tert.-butyl perbenzoate. This mixture was heated in a glass-walled cell for 65 hours at 65° C. and then for five hours at 110° C. The product was a hard, tough, colorless sheet having slight flexibility.

*Example 19*

A mixture of 50 parts of 2-methoxy-3-butenyl methacrylate and 50 parts of ethyl methacrylate was treated with one-half part of tert.-butyl perbenzoate and placed in a glass cell. The cell and contents were heated for 65 hours at 65° C. and for five hours at 110° C. The resulting sheet was a hard, tough, colorless product.

We claim:
1. A compound of the formula

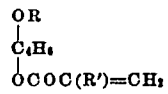

wherein R' is selected from the class consisting of hydrogen and the methyl group, $C_4H_6$ is an aliphatic chain of four carbon atoms having an olefinic linkage in the 3,4-position and having the linkages to oxygen in the 1- and 2-positions, and R is an aliphatic hydrocarbon group which is selected from the group consisting of alkyl groups of one to four carbon atoms and alkenyl groups of three to four carbon atoms, the unsaturated linkage therein being in the $\beta,\gamma$-position.

2. The compound of the formula

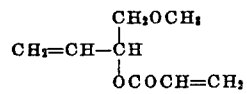

3. The compound of the formula

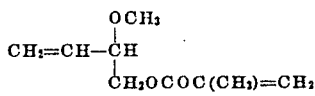

4. The compound of the formula

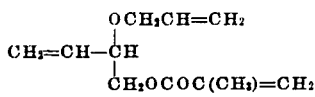

5. A polymer of an ester of the formula

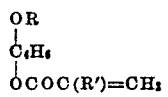

wherein R' is selected from the class consisting of hydrogen and the methyl group, $C_4H_6$ is an aliphatic chain of four carbon atoms having an olefinic linkage in the 3,4-position and having the linkages to oxygen in the 1- and 2-positions, and R is an aliphatic hydrocarbon group which is selected from the group consisting of alkyl groups of one to four carbon atoms and alkenyl groups of three to four carbon atoms, the unsaturated linkage therein being in the $\beta,\gamma$-position.

6. A polymer of an ester of the formula

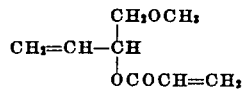

7. A polymer of an ester of the formula

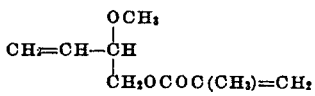

8. A polymer of an ester of the formula

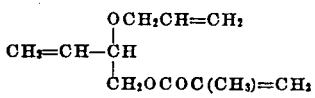

9. A copolymer of an ester of the formula

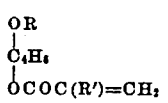

and another polymerizable vinylidene compound which is miscible and compatible with said ester, the ratio by weight of said ester to said vinylidene compound being from 50:50 to 90:10, in the above formula R representing a member of the class consisting of hydrogen and the methyl group, $C_4H_6$ being an aliphatic chain of four carbon atoms having an olefinic linkage in the 3,4-position and having the linkages to oxygen in the 1- and 2-positions, and R being an aliphatic hydrocarbon group which is selected from the group consisting of alkyl groups of one to four carbon atoms and alkenyl groups of three to four carbon atoms with the unsaturated linkage thereof in the $\beta,\gamma$-position.

10. The copolymer of claim 9 wherein the other polymerizable vinylidene compound is methyl methacrylate.

HARRY T. NEHER.
WILLARD J. CROXALL.
EDWIN H. KROEKER.

REFERENCES CITED

The following references are of record in the file of this patent:

UNITED STATES PATENTS

| Number | Name | Date |
|---|---|---|
| 2,129,665 | Barrett et al. | Sept. 13, 1938 |

OTHER REFERENCES

Columbia Technical Bulletin, BMO-44-1, published by Pittsburgh Plate Glass Co., received by Division 50, February 25, 1945.